F. HAMILTON.
EYE TESTING INSTRUMENT.
APPLICATION FILED APR. 22, 1919.
1,389,755.
Patented Sept. 6, 1921.
3 SHEETS—SHEET 1.
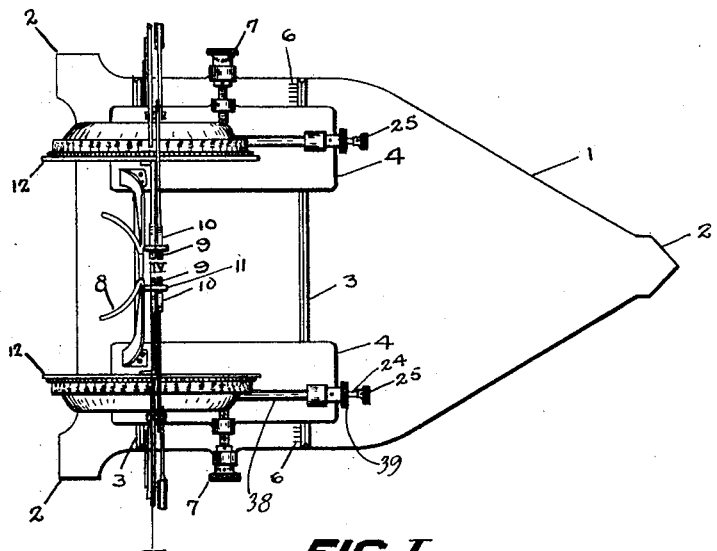
FIG. I
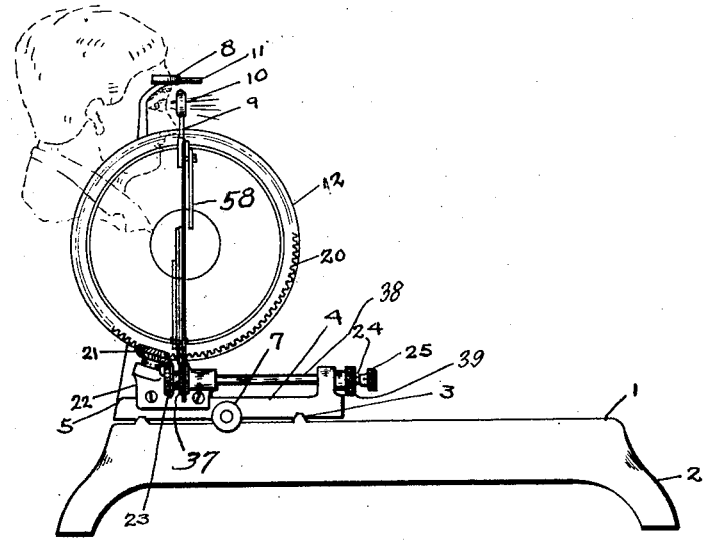
FIG. II
INVENTOR
FREDERICK HAMILTON
BY
H. H. Styll & H. K. Parsons
ATTORNEYS F. HAMILTON.
EYE TESTING INSTRUMENT.
APPLICATION FILED APR. 22, 1919.
1,389,755.
Patented Sept. 6, 1921.
3 SHEETS—SHEET 2.
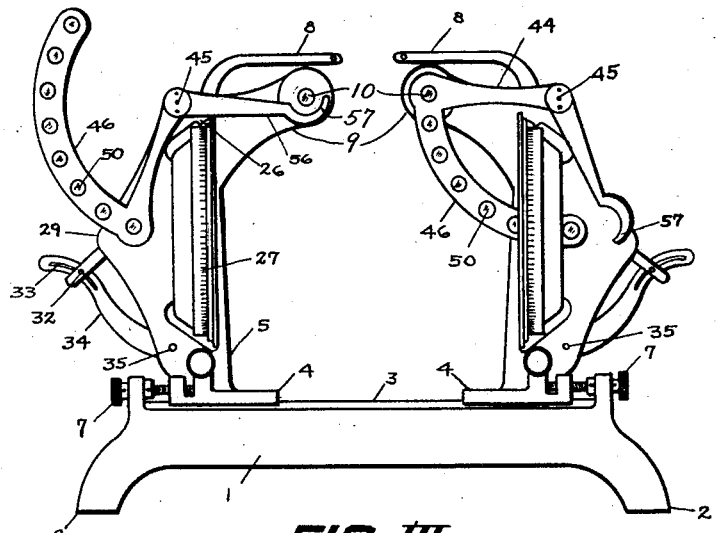
FIG. III
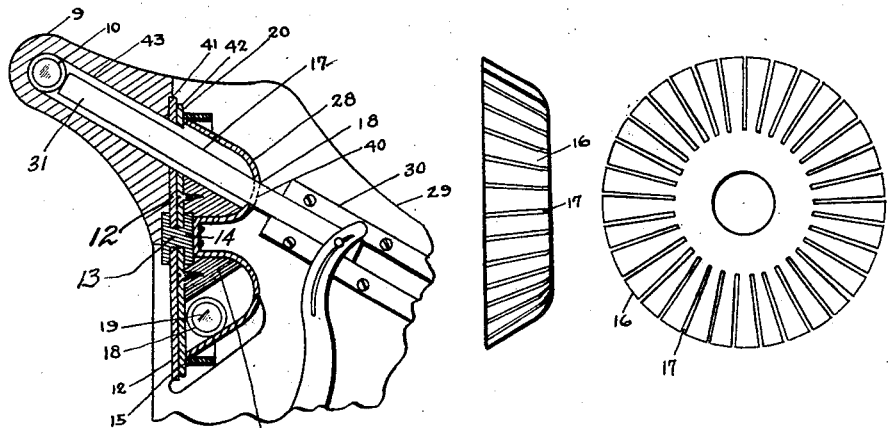
FIG. IV   FIG. V   FIG. VI
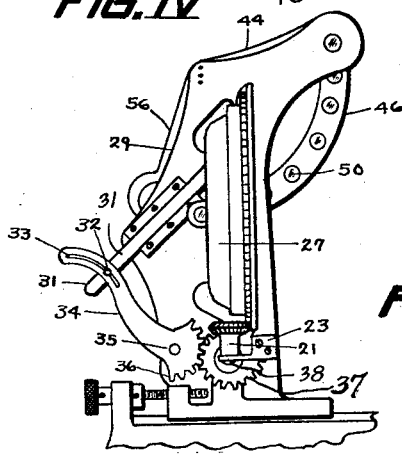
FIG. VII
INVENTOR
FREDERICK HAMILTON
BY
H. H. Styll & H. H. Parsons
ATTORNEYS F. HAMILTON.
EYE TESTING INSTRUMENT.
APPLICATION FILED APR. 22, 1919.
1,389,755. Patented Sept. 6, 1921.
3 SHEETS—SHEET 3.
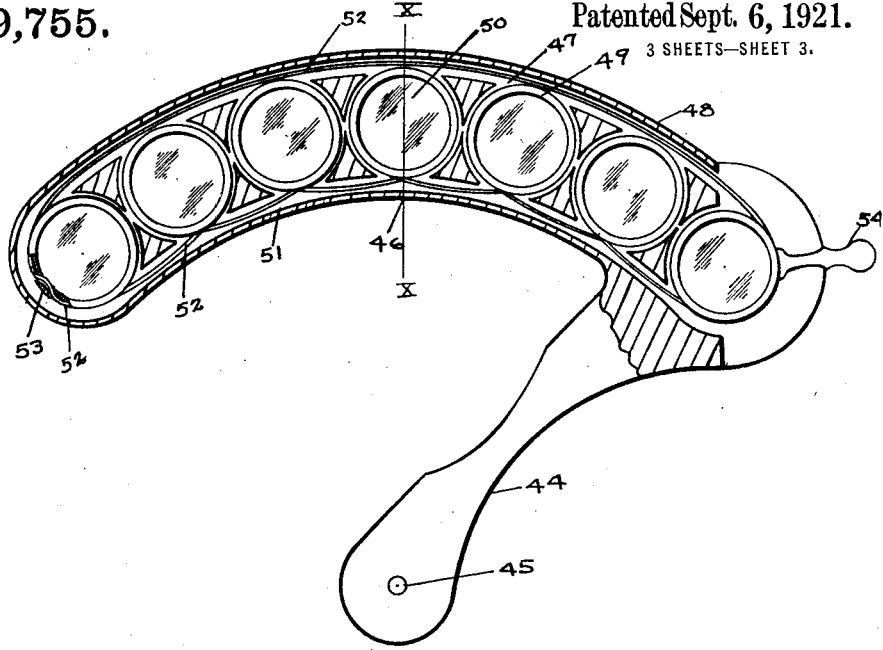
FIG. VIII
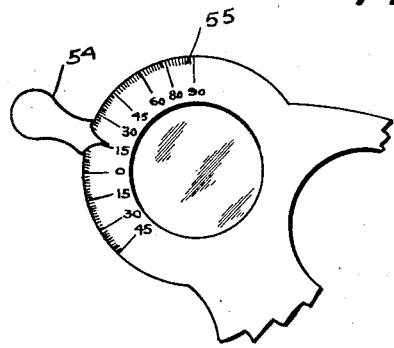
FIG. IX
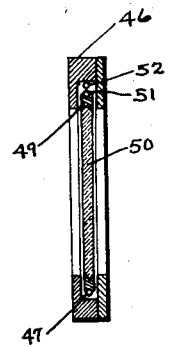
FIG. X
INVENTOR
FREDERICK HAMILTON
BY
H. H. Styll & H. K. Parsons
ATTORNEYS

UNITED STATES PATENT OFFICE.

FREDERICK HAMILTON, OF PROVIDENCE, RHODE ISLAND, ASSIGNOR TO AMERICAN OPTICAL COMPANY, OF SOUTHBRIDGE, MASSACHUSETTS, A VOLUNTARY ASSOCIATION OF MASSACHUSETTS.

EYE-TESTING INSTRUMENT.

1,389,755.  Specification of Letters Patent.  Patented Sept. 6, 1921.

Application filed April 22, 1919. Serial No. 291,896.

*To all whom it may concern:*

Be it known that I, FREDERICK HAMILTON, a citizen of the United States, residing at Providence, in the county of Providence and State of Rhode Island, have invented certain new and useful Improvements in Eye-Testing Instruments, of which the following is a specification.

This invention relates to improvements in eye testing instruments, and has particular reference to that type of instruments which carry a number of test lenses which may be selectively positioned before the eyes of a patient.

One of the objects of the present invention is the provision of an instrument of this character which shall be extremely compact in form, and in which the several test lenses shall be inclosed and protected by dust proof containers so that they will at all times be in clean and sanitary condition ready for use.

A further object of the present invention is the provision of an improved instrument which may be simply and readily manipulated by means disposed distant from the face of the wearer so that the patient will receive minimum annoyance from the hands of the operator working on or about his face.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a plan view of one embodiment of my instrument.

Fig. II represents a side elevation thereof, illustrating the position occupied by the patient.

Fig. III represents a front view of the intrument, illustrating the position and adjustment of the several parts thereof.

Fig. IV represents a sectional view taken as on the line IV—IV of Fig. I.

Fig. V represents a detail view of the spherical lens carrier removed.

Fig. VI represents a face view of the spherical lens holder of Fig. V.

Fig. VII represents a fragmentary perspective view of the spherical case and controlling mechanism therefor.

Fig. VIII represents a view of the adjustable cylinder series with cover plate removed and parts broken away.

Fig. IX is an enlarged detail view of the cylinder axis indicator.

Fig. X represents an enlarged sectional view as on the line X—X of Fig. VIII.

In the drawings, in which similar characters of reference are employed to denote corresponding parts throughout the views, the numeral 1 denotes the base frame of my instrument provided with the supporting legs 2, adapted to rest on a suitable table or other support therefor. I have here illustrated my instrument as of the preferred or binocular form, embodying a set of lenses for each eye of the patient, the sets on both sides being duplicates, and a detail description of one set, therefore, serving for both.

The base 1 is provided with the transversely extending guides 3, on which are mounted the slide blocks 4 carrying the uprights or standards 5. The purpose of mounting the standards on slide blocks is to enable the two portions of the instrument to be laterally adjusted as desired according to the pupillary distance of the patient being tested, if desired the guide 3 being provided with suitable graduations 6 to indicate the adjustment of each slide block, adjusting screws 7 being preferably employed to facilitate the in and out movement of the parts and hold them in desired adjusted position and prevent accidental removal therefrom during the testing operation.

Carried by each of the standards 5 is a head rest portion 8 adapted to engage the forehead of the patient in order that the patient may be in correct relation to the instrument, an eye piece bracket 9 having a sight aperture 10 being disposed adjacent the head piece, while a projecting stud 11 on the head piece permits of the ready attachment of various special trial case accessories to supplement the inherent capabilities of the instrument when desired. Carried by the standard 5 is the journal plate 12, on which is rotatably secured, through the use of the space plate 13 and cap 14, the main plate or disk 15 of the lens carrier. This plate 15 has secured to it a suitable carrier 16, as illustrated in detail in Figs. V and VI. This may be formed from either vulcanite or other suitable material and has a multiplicity of radiating slots 17 in which fit the lens cells 18 bearing the several lenses 19 desired for use in testing the eyes of the patient. The outer edge of the disk or plate 15 is formed into the gear teeth 20 which mesh with the idler spur and bevel pinion 21 on the bracket 22 of the standard, this pinion in turn being driven by means of the bevel gear 23 on the shaft 24, which extends forwardly along the standard 5 and terminates in the thumb piece 25. It will thus be seen that rotation of the thumb piece will serve, through the shaft and gearing just referred to, to cause rotation of the lens carrier upon the standard, a suitable indicator being provided as at 26 to coöperate with the dial ring 27 on the disk 15 to indicate the particular lens which is brought into operative position by such rotation. A casing 28 interlocks with the dial ring and with the cap 14 to inclose the lens carrier and prevent entrance of dust thereinto. This casing is further braced and supported by the transverse bracket member 29, which is provided with the inclined guide way 30, in which slides the operating plunger or lens shifter 31, having a pin 32 riding in the slot 33 of the rock arm 34, which is pivoted as at 35 to the bracket 29. The arm below its point of pivotance is provided with the rack segment 36 in mesh with the pinion 37 on the tubular shaft 38 which incloses the shaft 24 and is provided adjacent the thumb piece 35 with its own thumb piece 39, whereby rotation of the thumb piece 39 will serve through the tubular shaft and pinion to impart a rocking movement to the arm 34.

The purpose of this mechanism should be best understood by reference to Figs. IV and VII, from which it will be seen that when in lowermost position the plunger is out of engagement with the lens carrier, allowing its free rotation, while when the lens carrier has been rotated to the desired extent and the arm then rocked this rocking movement of the arm will, through the action of the slot and pin, slide the plunger forward in its guides, when it will pass through the slot 40 in the lens carrier case 28 and into one of the slots 17, pressing the lens carrying ring 18 out of the slot 17 through the alined slots 41 and 42 in the lens carrier plate 15 and disk 12, respectively, and in its continued movement will slide the lens ring or holder 18 up into the inclosed guide way 43 until it coincides with the boundary of the sight aperture 10 of the member 9, or, in other words, has reached the position illustrated in connection with Fig. IV, the desired lens then being in position before the eye of the patient for suitable testing purposes. If it is desired to substitute another lens it is merely necessary to reversely rotate the tubular shaft withdrawing the lens and plunger, when the lens will, by gravity, fit back into its proper slot and the carrier may be rotated to bring a new lens in position, when this lens may similarly be slid up before the eye of the patient.

When it is desired to test for cylindrical blanks I preferably make use of my improved attachment illustrated in operative position at the left of Fig. III, and shown in detail in connection with Figs. VIII to X inclusive. This device is designed as an integral part of the instrument, although it will be understood that it may be made up as a separate attachment if preferred. In the form illustrated I make use of the carrier arm 44 pivoted at 45 to the bracket plate 29, and being provided at its upper end with the segment shaped cylinder case 46 which is arranged concentric with the point of pivotance 45. This case, as illustrated in Fig. VIII, is provided with a series of circular chambers 47 connected by the inner and outer arcuate paths or tracks 48. Contained within the chambers 47 are the cylinder lens cells 49 bearing the lenses 50, and being formed with the outer peripheral grooves 51 receiving the continuous or endless connecting wire 52 which is secured at one point to each of the cells, as at 53 for example, as shown in Fig. VIII. This wire starts, for example, with the right hand cell and is looped consecutively around and at one point from the periphery of each cell, secured to each cell and then extends back to the original cell, the idea being that the cells are all so coupled together that rotation of the right hand cell through the medium of the handle 54, for example, will cause a corresponding degree of rotation of each of the other cylindrical lenses.

The purpose of this should be readily understood, since it will be seen that different cylindrical lenses are contained in the several cells, each with its axis so disposed that when the arm 44 is swung to bring a selected or predetermined one of the cylindrical lenses in front of the sight aperture 10 the axis will be in predetermined relation to the eye, as will be indicated upon the protractor 55. If it is desired to test the eye with the axis of the cylinder at a different angle it is merely necessary to turn the handle the desired amount, as shown by the protractor, and this movement will correspondingly shift each of the lenses so that the arm may be swung back and forth to try out different cylindrical values before the eye and each cylinder will have its axis at the same degree as the preceding one.

If the variations in cylindrical power contained in the head 46 are insufficient, or if it is desired to substitute other lenses for those being tried out at any time, or to supplement the range of the instrument itself, I have in addition mounted upon the pivot 45 the carrier arm 56 provided with the head 57, having a pair of channels adapted to receive ordinary trial case rings, while a suitable trial set holder may be mounted on the base 1 of the instrument between the standards 5 to contain any desired accessories for use in connection with the instrument.

It will further be noted that the cylindrical testing device is normally swung downward out of the way, as illustrated at the right of Fig. III, but that when desired the same can be swung forward and inward to present any desired lens before the sight aperture 10, or to selectively present the several lenses in this position as the parts swing downward, the free end of the segment being allowed to swing reversely outward through the central slot 58 in the plate 12 and parts 13 and 14. Further it will be noted that on account of the position of the pivot 45, about which the arms 44 and 56, swing, the upper edge of the plate 58 serves as a stop to insure the part 57 being in exact correct relation to the sight aperture 10, and also serves to limit the downward swinging of the cylindrical device, if desired a suitable spring friction device or the like being employed to retain the cylinder testing device at any desired adjusted position.

It will also be noted that the friction on the slide or plunger member 31 is sufficient to prevent accidental sliding thereof, and to retain it in upwardly raised position, and that when in upwardly shifted position holding a lens before the eye it extends transversely through the slot 17 of the lens carrier wheel, and locks this wheel against rotation, while as the lens in the absence of the plunger 31 is, on account of the inclination of the member 43, caused to roll back or by gravity return to the slot 17 from which it has been forced, immediately following up the withdrawal of the plunger the lens cell will be entering into the slot 17 at the one side before the plunger has been withdrawn therefrom at the opposite side, so the plunger thus serves to automatically lock the wheel against accidental rotation until the lens is in engagement with its proper cell, so that all liability of improper selection or return of lenses to the several slots is thus eliminated.

From the foregoing description taken in connection with the accompanying drawings, the construction and method of use of my improved instrument should be readily understood, and it will be seen that I have provided an improved form of dust-proof container for spherical lenses, which may be readily rotated to bring the desired lens into position and from which the lens may be shifted into exact position in front of the face of the patient without the hand of the operator in any wise approaching the face of the patient, and with the operator or person conducting the test in position to determine the correctness of the lens introduced, and in which the cylindrical lens series may be readily swung in front of the eye and various cylinders tried out all at any desired axis, which axis may be instantly adjusted as desired for the whole series.

I claim:

1. An eye testing instrument, including a rotatable carrier, a series of lens holding rings loosely supported within the carrier, and means for selectively ejecting the lens from the carrier as desired.

2. An eye testing instrument, including a lens carrier, lens cells loosely mounted within the carrier, a bracket having a sight aperture and mechanical means for transferring a selected lens cell from the carrier to the bracket.

3. A device of the character described, including a lens carrier and a testing bracket, and a plunger for shifting a lens cell from the carrier to the bracket.

4. An eye testing instrument, including a rotatable slotted wheel, lens cells contained within the slots of the wheel, a test bracket, and means shiftable through the slots of the wheel for moving a selected lens cell from the slot to the bracket.

5. An eye testing device, including a standard, a rotatable lens carrier on the standard, lens cells loosely held by the carrier, a testing bracket disposed above the carrier, and means for lifting a selected cell from the carrier to the bracket.

6. An eye testing device, including a standard, a rotatable lens carrier on the standard, lens cells loosely held by the carrier, a testing bracket disposed above the carrier, and means for lifting a selected cell from the carrier to the bracket and retaining it in proper position.

7. An eye testing device, including a standard, a rotatable lens carrier on the standard, lens cells loosely held by the carrier, a testing bracket disposed above the carrier, and means for lifting a selected cell from the carrier to the bracket and retaining it in proper position, said means locking the carrier against rotation in the absence of the lens.

8. In an eye testing device, a lens holder having a plurality of cells rotatably mounted therein, an endless band secured to and connecting the several cells, and means for shifting the band to simultaneously equally rotate the several cells.

9. An eye testing instrument including a lens holder having a plurality of lens cells rotatably mounted therein, an endless band encircling and secured to each of the cells, and means for rotating one of the cells whereby the pull on the band will similarly rotate each of the other cells a corresponding amount.

10. An eye testing instrument including a lens holder having a plurality of lens cells rotatably mounted therein, an endless band encircling and secured to each of the cells, means for rotating one of the cells whereby the pull on the band will similarly rotate each of the other cells a corresponding amount, said rotating means including an operating handle and a coöperating pointer and protractor carried by the handle and lens cell support for indicating the amount of rotation imparted to the several lenses.

11. An eye testing instrument including a base, a support rising from the base, a rotatable lens carrier held by the support, an ejector for coöperation with the lens carrier, said carrier and ejector each being provided with toothed portions, operating pinions in mesh with said toothed portions, and means for rotating said pinions to selectively operate the parts.

12. An instrument of the character described including a support, a lens carrier rotatably mounted on the support, means for selectively ejecting a lens from the carrier, and a dial on the carrier for indicating the particular lens engaged by the ejector.

13. A device of the character described including a base, a support rising from the base having a sight aperture and an ejector slide and a lens carrier rotatable on the support and movable between the slide and sight aperture whereby the slide may be operated to selectively shift a lens from the carrier into position in the sight aperture.

14. The combination with base, of a support rising therefrom, said support including a lens holder and a plunger for controlling the position of a lens within the holder, a lens case carried by the support and having a plunger receiving aperture extending therethrough, and a lens carrier rotatably mounted on the support for successively presenting a series of lenses in alinement with the plunger slot, substantially as and for the purpose described.

15. In a machine of the character described, the combination with a support and a lens carrier mounted thereon, of a plunger for coöperation with the lens carrier including a reciprocable member, a rock arm connected with said member and having a segmental toothed head, an operating pinion in mesh with said head, and means for rotating the pinion to rock the arm and thus reciprocate the plunger.

16. A lens testing instrument including a standard, a carrier wheel rotatably mounted on the standard and bearing a series of spherical lenses, a member adjacent the wheel having a sight aperture, means for selectively shifting a lens from the wheel into alinement with the sight aperture, an arm pivoted to the standard and terminating in an arcuate head disposed with the pivot as its center of curve, and a plurality of cylindrical lenses rotatably mounted in the arcuate head, the distance from the point of pivotance to the sight aperture being the same as the length of the arm, whereby the cylinder lenses carried by the arm may be selectively positioned before the sight aperture.

In testimony whereof I have affixed my signature, in presence of two witnesses.

FREDERICK HAMILTON.

Witnesses:
RHODES A. ELDRED,
HARRY T. DANIELS, Jr.